(12) United States Patent
Reese

(10) Patent No.: US 11,502,614 B2
(45) Date of Patent: Nov. 15, 2022

(54) MAGNETIC COMPONENTS WITH ELECTRICALLY VARIABLE CHARACTERISTICS

(71) Applicant: Raytheon Company, Waltham, MA (US)

(72) Inventor: Bradley A. Reese, Boylston, MA (US)

(73) Assignee: Raytheon Company, Waltham, MA (US)

( * ) Notice: Subject to any disclaimer, the term of this patent is extended or adjusted under 35 U.S.C. 154(b) by 233 days.

(21) Appl. No.: 16/742,940

(22) Filed: Jan. 15, 2020

(65) Prior Publication Data
US 2021/0218337 A1 Jul. 15, 2021

(51) Int. Cl.
*H02M 3/337* (2006.01)
*H01F 27/24* (2006.01)
*H01F 27/30* (2006.01)

(52) U.S. Cl.
CPC .......... *H02M 3/3376* (2013.01); *H01F 27/24* (2013.01); *H01F 27/306* (2013.01)

(58) Field of Classification Search
CPC .. H02M 3/3376; H02M 1/0064; H02M 3/003; H01F 27/24; H01F 27/306
See application file for complete search history.

(56) References Cited

U.S. PATENT DOCUMENTS

| | | | |
|---|---|---|---|
| 2,831,157 A | 4/1958 | Harry et al. | |
| 3,359,511 A | 12/1967 | Varnell, Jr. | |
| 3,622,868 A * | 11/1971 | Todt | H01F 29/146 336/155 |
| 4,206,434 A * | 6/1980 | Hase | H01F 21/08 336/215 |
| 5,684,578 A | 11/1997 | Barrett | |
| 6,362,718 B1 * | 3/2002 | Patrick | H01F 29/14 977/777 |
| 2008/0068119 A1 | 3/2008 | Avila Montes | |
| 2013/0162968 A1* | 6/2013 | De Groot | G03F 7/70758 355/72 |

FOREIGN PATENT DOCUMENTS

| | | |
|---|---|---|
| EP | 3739601 A1 | 11/2020 |
| WO | 2018/023175 | 2/2018 |

OTHER PUBLICATIONS

International Search Report and Written Opinion dated Jun. 14, 2021 in corresponding International Application No. PCT/US2020/067243.

(Continued)

*Primary Examiner* — Adolf D Berhane
*Assistant Examiner* — Afework S Demisse
(74) *Attorney, Agent, or Firm* — Renner, Otto, Boisselle & Sklar, LLP

(57) ABSTRACT

A magnetic component includes a main magnetic core, a power winding coupled to the main magnetic core, a variable reluctance core element arranged in a flux path of the main magnetic core and including a saturable magnetic core and a control winding coupled to the saturable magnetic core. The control winding is isolated relative to the power winding and configured to selectively saturate a section of the saturable magnetic core.

15 Claims, 7 Drawing Sheets

(56) References Cited

OTHER PUBLICATIONS

Aghaei Morteza et al: "A High Voltage Variable Inductor LCC Resonant Converter with High Power Factor over Wide Load Range", 2019 10th International Power Electronics, Drive Systems and Technologies Conference (PEDSTC), IEEE, Feb. 12, 2019, pp. 279-284.
Invitation to Pay Additional Fees dated Apr. 20, 2021 in corresponding International Application No. PCT/US2020/067243.
Brudny JF et al: "An Improved Method for Virtual Air Gap Length Computation", IEEE Transactions on Magnetics, IEEE Service Center, New York, NY, US, vol. 41, No. 10, Oct. 1, 2005 (Oct. 1, 2005), pp. 4051-4053.

* cited by examiner

MAGNETIC COMPONENTS WITH ELECTRICALLY VARIABLE CHARACTERISTICS

FIELD OF THE INVENTION

The invention relates to magnetic components having variable magnetic characteristics.

DESCRIPTION OF THE RELATED ART

Various applications use resonant power converters to achieve high power densities under certain operating conditions. Exemplary applications requiring high density and regulated power conversion include high energy lasers, air and missile defense radars, and hybrid energy storage modules. Other aerospace applications and ground transportation applications may also require high power density. Certain operating conditions may limit the ability of the power converter to regulate voltage or synchronize switching frequencies such that additional components for controlling the power density of the converter are used in particular applications.

Prior attempts to control the power density in resonant power converters includes using magnetic amplifiers to amplify the electrical signals. The inductance of the magnetic amplifiers may be dynamically adjusted by applying current to control windings. However, using magnetic amplifiers is disadvantageous in that high voltage is induced on the control windings and bulky high voltage isolation is required. Consequently, high induced voltage results in noise in the circuit and reduced power density for the power converter.

SUMMARY OF THE INVENTION

A resonant power converter according to the present application includes using a variable reluctance core element (VRCE) to vary the magnetic characteristics of a magnetic component for a power converter. The VRCE includes at least one control winding that locally saturates a section of a saturable magnetic core of the VRCE to change the reluctance of the VRCE, as compared with magnetic amplifiers that saturate the entire magnetic core of a magnetic component. The control winding is oriented within the saturable core such that the control winding is isolated relative to a power winding of the main magnetic core. The orientation prevents flux from the power winding from passing through the control winding and induced voltage on the control winding is eliminated. Thus, the overall size of the resonant converter is reduced as compared with using magnetic amplifiers that require bulky high voltage isolation.

Still another advantage is that the VRCE or a plurality of VRCEs may be arranged in different sections of the magnetic core to more precisely control the magnetic characteristics of the magnetic component as compared with using a magnetic amplifier. Accordingly, a resonant power converter having a magnetic component with the VRCE is able to simultaneously achieve high power density, voltage regulation, and frequency synchronization, as compared with using a magnetic amplifier which is deficient in simultaneously achieving all of these advantages.

According to an aspect of the invention, a magnetic component includes a main magnetic core, a power winding coupled to the main magnetic core, and a variable reluctance core element arranged in a flux path of the main magnetic core.

According to an aspect of the invention, a magnetic component includes a main magnetic core, a power winding coupled to the main magnetic core, and a variable reluctance core element arranged in a flux path of the main magnetic core that includes a saturable magnetic core and a control winding coupled to the saturable magnetic core, with the control winding being isolated relative to the power winding and configured to selectively saturate a section of the saturable magnetic core.

According to an embodiment of any paragraph(s) of this summary, the control winding includes at least one turn.

According to an embodiment of any paragraph(s) of this summary, the variable reluctance core element defines an artificial air gap when current is applied to the control winding.

According to an embodiment of any paragraph(s) of this summary, an air gap is defined between the main magnetic core and the at least one variable reluctance core element.

According to an embodiment of any paragraph(s) of this summary, the power winding includes a primary power winding coupled to a first section of the main magnetic core and a secondary power winding coupled to a second section of the main magnetic core.

According to an embodiment of any paragraph(s) of this summary, the variable reluctance core element includes a first variable reluctance core coupled between the first section and the second section and a second variable reluctance core coupled to the second section.

According to an embodiment of any paragraph(s) of this summary, the control winding is configured to receive a DC voltage.

According to an embodiment of any paragraph(s) of this summary, the control winding is configured to receive an AC voltage.

According to an embodiment of any paragraph(s) of this summary, the variable reluctance core element includes more than one control winding.

According to an embodiment of any paragraph(s) of this summary, a plurality of variable reluctance core elements are arranged at different locations around the main magnetic core.

According to another aspect of the invention, a resonant power converter includes a magnetic component having a main magnetic core and a power winding coupled to the main magnetic core, and a variable reluctance core element arranged in a flux path of the main magnetic core and including a saturable magnetic core and a control winding coupled to the saturable magnetic core, wherein the control winding is isolated relative to the power winding and configured to selectively saturate a section of the saturable magnetic core.

According to an embodiment of any paragraph(s) of this summary, the control winding includes at least one turn.

According to an embodiment of any paragraph(s) of this summary, the variable reluctance core element defines an artificial air gap when current is applied to the control winding.

According to an embodiment of any paragraph(s) of this summary, an air gap is defined between the main magnetic core and the at least one variable reluctance core element.

According to an embodiment of any paragraph(s) of this summary, the power winding includes a primary power winding coupled to a first section of the main magnetic core and a secondary power winding coupled to a second section of the main magnetic core.

According to an embodiment of any paragraph(s) of this summary, the variable reluctance core element includes a first variable reluctance core coupled between the first section and the second section and a second variable reluctance core coupled to the second section.

According to an embodiment of any paragraph(s) of this summary, the control winding is configured to receive a DC or AC voltage.

According to still another aspect of the invention, a method of varying magnetic characteristics of a magnetic component having a main magnetic core and a power winding coupled to the main magnetic core includes arranging a variable reluctance core element in a flux path of the main magnetic core, isolating a control winding of the variable reluctance core element from the power winding, and locally saturating sections of a saturable magnetic core of the variable reluctance core element using the control winding.

According to an embodiment of any paragraph(s) of this summary, the method includes increasing a reluctance of the variable reluctance core element by applying a voltage to the control winding to form at least one artificial air gap in the variable reluctance core element.

According to an embodiment of any paragraph(s) of this summary, the method includes confining flux from the control winding to the variable reluctance core element using air gaps in the main magnetic core.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein may be used in applications that require high power density and resonant power converters including semiconductors, capacitors, and other suitable components. Exemplary applications include high energy lasers, air and missile defense radars, and hybrid energy storage modules. Other aerospace applications and ground transportation applications may also be suitable. Non-military applications may be suitable. Many other applications may be suitable.

Figure 1:
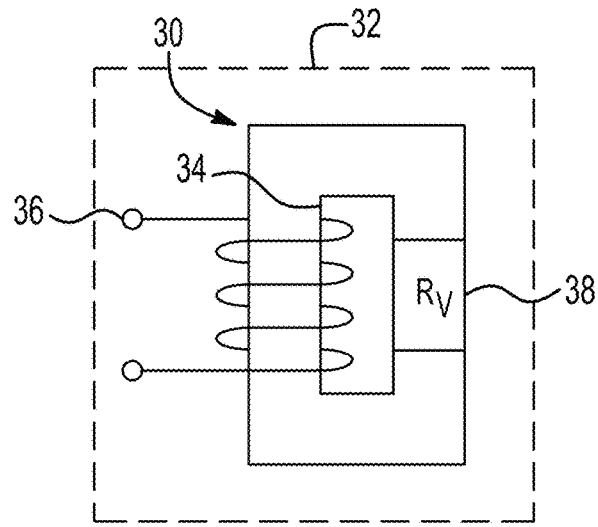
FIG. 1 shows a magnetic component including a variable reluctance core element (VRCE).

Referring first to FIG. 1, a magnetic component 30 is shown. The magnetic component 30 may be arranged in a resonant power converter 32 and includes a main magnetic core 34 and a power winding 36 that is coupled to the main magnetic core 34. The main magnetic core 34 is configured to act as a conductor for a magnetic field and may have any suitable geometric shape that is dependent on the application. Suitable shapes include rectangles, cylinders, or other polygonal three-dimensional shapes. Other shapes that are non-polygonal may also be suitable. The main magnetic core 34 may be formed of any suitable material or a combination of materials including iron, nickel, cobalt, amorphous steel, ferrous ceramics, silicon steel, iron-based amorphous tape, and other ferromagnetic metals or metallic alloys. Many other materials may be suitable and the material is dependent on the application. The power winding 36 is formed of a coil of insulated wire that is wound around the main magnetic core 34. Any suitable material may be used for the power winding 36, such as copper or aluminum that is insulated with any suitable insulating material. A suitable insulating material may include enamel. In exemplary embodiments, the magnetic component 30 may include at least one of a main magnetic core having multiple sections or a plurality of power windings.

Figure 2:
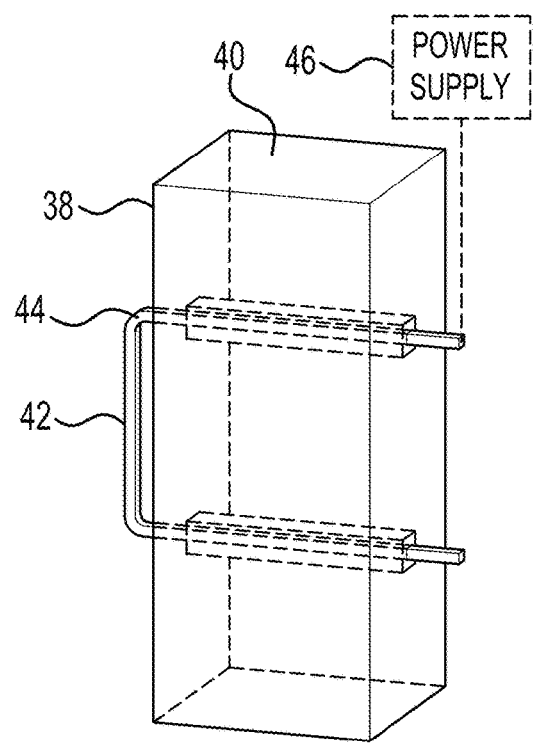
FIG. 2 shows a front perspective view of the VRCE of FIG. 1.
Figure 3:
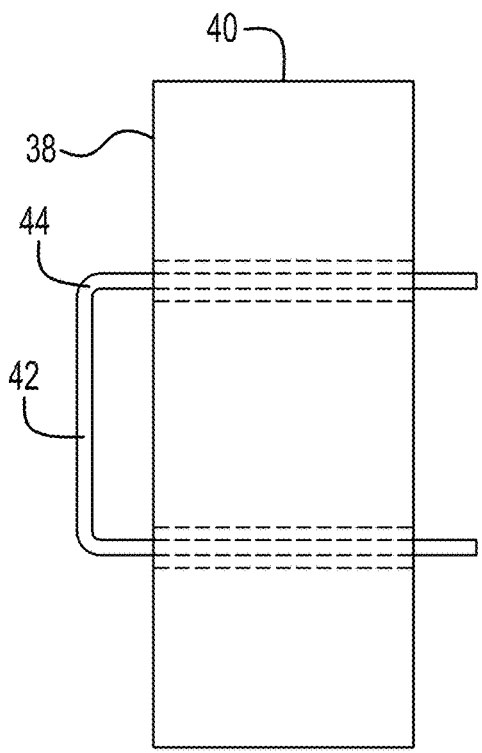
FIG. 3 shows a front view of the VRCE of FIG. 2.
Figure 4:
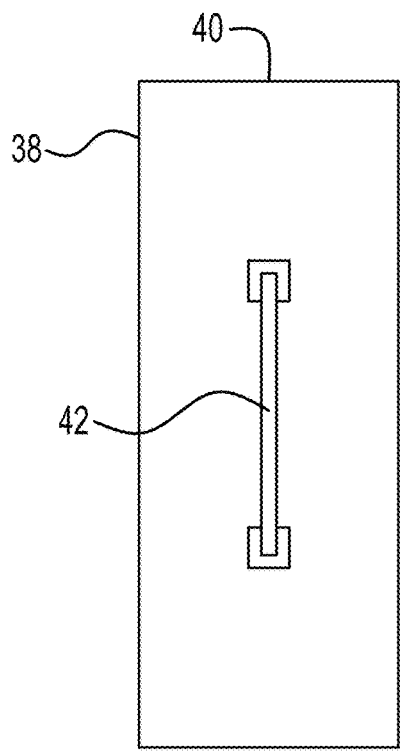
FIG. 4 shows a side view of the VRCE of FIG. 2.

Referring in addition to FIGS. 2-4, a variable reluctance core element (VRCE) 38 is arranged in a flux path of the main magnetic core 34 of the magnetic component 30. The VRCE 38 is configured to provide magnetic resistance or reluctance $R_V$ in the electrical circuit for the main magnetic core 34. FIG. 2 shows a perspective view of an exemplary embodiment of the VRCE 38, FIG. 3 shows a front view of the VRCE 38, and FIG. 4 shows a side view of the VRCE 38. The VRCE 38 includes a saturable magnetic core 40 and a control winding 42 that is arranged in the saturable magnetic core 40. The saturable magnetic core 40 may have any suitable geometric shape and may be formed of any material that is also suitable for the main magnetic core 34. The shape and material are dependent on the application.

The location of the VRCE 38 in the magnetic component 30 may be selected based on specific magnetic characteristics of the magnetic component 30 that are to be controlled or varied using the VRCE 38. More than one VRCE may be used and the number of VRCEs is dependent on the application. For example, the number of VRCEs may be dependent on the number of outputs or the number of windings. For example, in applications having a magnetic component with more than one power winding, one VRCE may be provided for each winding.

The control winding 42 is formed of a coil of insulated wire and may be formed of any material that is also suitable for the power winding 36. The VRCE 38 may include more than one control winding and the number of control windings and the material is dependent on the application. Each control winding 42 is arranged in a predetermined orientation within the saturable magnetic core 40 to eliminate an induced voltage on the control winding 42, i.e. the control winding 42 is oriented such that the control winding 42 is isolated from the power winding 36. At least one curve or turn 44 is formed in the control winding 42 and the number of turns and shapes of the turns is dependent on the application and the desired magnetic characteristics. For example, one turn is defined as wrapping the winding around the core one time and ten turns are formed by wrapping the same winding around the core ten times. A power supply 46 is coupled to the control winding 42 to supply a current to the control winding 42, which may be AC or DC depending on the application.

Figure 7:
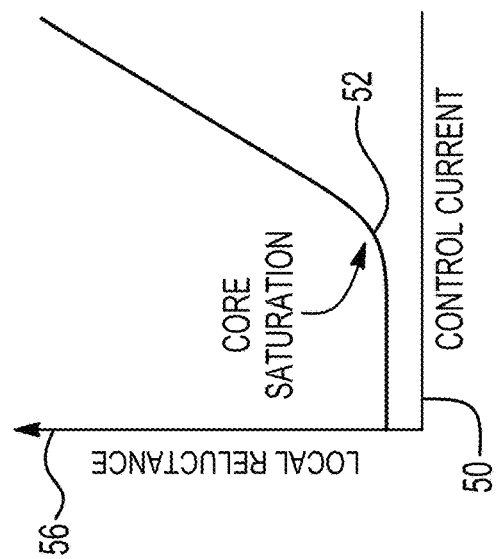
FIG. 7 is a graph showing a relationship between reluctance of the VRCE of FIG. 1 and the control current.
Figure 6:
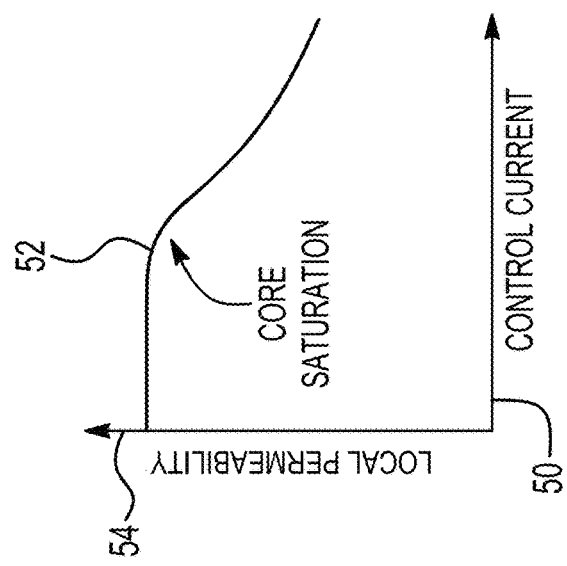
FIG. 6 is a graph showing a relationship between permeability of the VRCE of FIG. 1 and the control current.
Figure 5:
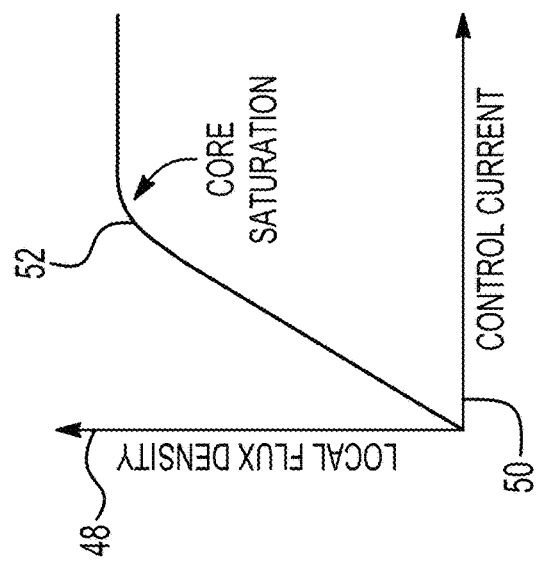
FIG. 5 is a graph showing a relationship between flux of the VRCE of FIG. 1 and a control current being applied to a control winding of the VRCE.

Referring in addition to FIGS. 5-7, using the VRCE 38 is advantageous in that the saturable magnetic core 40 of the VRCE 38 is configured to operate in a state of saturation without permanently altering magnetic characteristics of the main magnetic core 34. FIG. 5 shows the relationship between a magnetic flux 48 of the saturable magnetic core 40 and an amount of control current 50 that is supplied to the control winding 42 via the power supply 46. As shown in FIG. 5, when the saturable magnetic core 40 reaches a saturation state 52, the saturable magnetic core 40 is fully magnetized and produces the maximum magnetic flux. The VRCE 38 is dimensioned to enable the saturable magnetic core 40 to saturate within small bands near the control winding 42 when a sufficient amount of the control current 50 is applied to the control winding 42.

FIG. 6 shows the relationship between permeability 54 of the VRCE 38 and the control current 50 and FIG. 7 shows the relationship between reluctance 56 in the VRCE 38 and the control current 50. The permeability 54 corresponds to the slope of the curve showing the flux density 48 versus the control current 50 shown in FIG. 5. As shown in FIG. 6, high permeability enables a large amount of magnetic field per every unit of current. When the control current 50 is low, the permeability 54 stays the same and as the control current 50 increases, the permeability 54 decreases. When the saturable magnetic core 40 reaches the saturation state 52, the permeability within the bands near the control winding 42 decreases such that the reluctance increases. The saturated bands within the VRCE 38 essentially act as electrically variable artificial air gaps within the magnetic component 30 to increase the reluctance.

Figure 8:
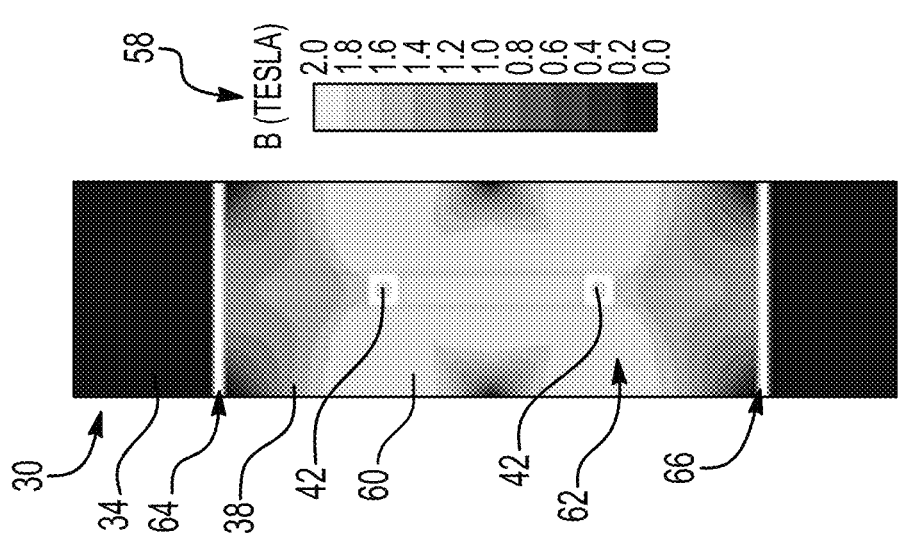
FIG. 8 shows a finite element simulation of the VRCE of FIG. 1.

FIG. 8 shows a finite element simulation of the VRCE 38 having the single control winding 42 shown in FIGS. 2-4. The simulation shows a varying magnetic field 58 along the magnetic component 30 when current is applied to the control winding 42. When current is applied, two artificial air gaps 60, 62 may be formed proximate the control winding 42 in the VRCE 38 to increase the reluctance. For example, the magnetic field in the artificial air gaps 60, 62 proximate the control winding 42 may have a strength of approximately 2 tesla whereas the magnetic field toward the main magnetic core 34 may have a strength that is less than 0.2 tesla. The magnetic field will be dependent on the material and the application such that the strengths will vary. The main magnetic core 34 of the magnetic component 30 may also include real air gaps 64, 66 formed therein that are used to limit how low the reluctance in the path of the main magnetic core 34 will be once the control current is no longer applied to the control winding 42. The real air gaps 64, 66 may be fixed in shape and size whereas the artificial gaps 60, 62 are variable in shape and size depending on the amount of current being supplied to the control winding 42.

Using the VRCE 38 is advantageous in saturating only sections within the magnetic component 30, as compared with conventional magnetic amplifiers that saturate the entire magnetic component. For example, using the VRCE 38 may enable one tenth of the magnetic component to be saturated while maintaining the same characteristics as when the entire magnetic component is saturated. Accordingly, using the VRCE prevents permanent damage to magnetic properties of the magnetic component 30.

Figure 10:
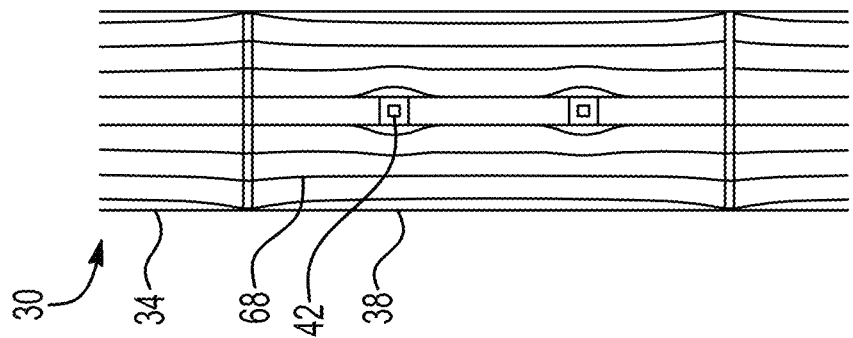
FIG. 10 shows flux lines in the VRCE and the main magnetic core of the magnetic component of FIG. 1 when only a power winding of the magnetic component is excited.
Figure 9:
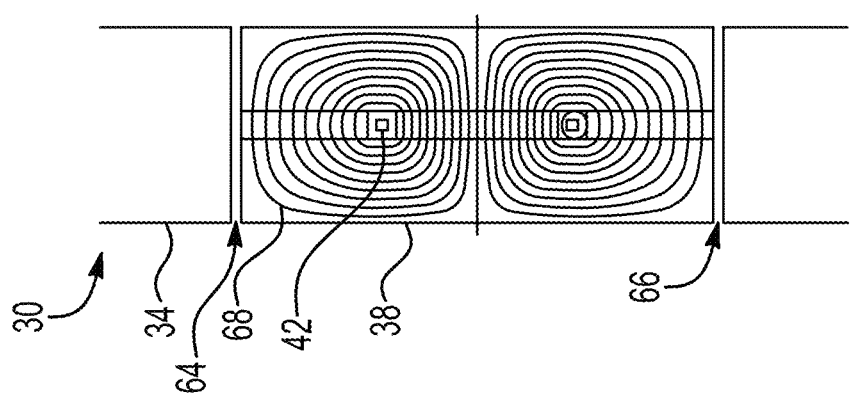
FIG. 9 shows flux lines in the VRCE and the main magnetic core of the magnetic component of FIG. 1 when only the control winding of the VRCE is excited.

FIGS. 9 and 10 show flux lines 68 in the magnetic component 30. FIG. 9 shows the flux lines 68 in the VRCE 38 and in the main magnetic core 34 when only the control winding 42 is excited and FIG. 10 shows the flux lines 68 when only the power winding 36 for the main magnetic core 34 (as shown in FIG. 1) is excited. As shown in FIG. 9, using the real air gaps 64, 66 of the main magnetic core 34 enables the flux from the control winding 42 to be confined to the VRCE 38. Using the real air gaps 64, 66 is particularly advantageous in applications in which the material of the main magnetic core 34 may be damaged by high magnetic fields.

As shown in FIG. 10, the control winding 42 is oriented such that most of the flux from the power winding 36 does not pass through the control winding 42. Thus, the induced voltage on the control winding 42 is minimized, or is zero. For example, the control winding 42 may be arranged perpendicular relative to the direction of the flux of the power winding 36. The control winding 42 may be configured to receive AC or DC voltage and the voltage may be dependent on the material of the control winding 42. Given that the control winding 42 is insulated relative to the main magnetic core 34, the main magnetic core 34 and the control winding 42 may have different voltages.

Figure 11:
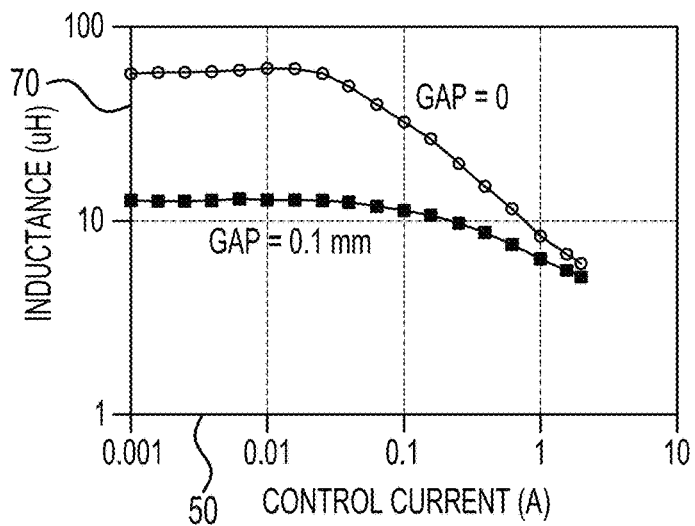
FIG. 11 is a graph showing a relationship between inductance and the control current when the main magnetic core of FIG. 1 has a zero gap or a gap of 0.1 millimeters.
Figure 12:
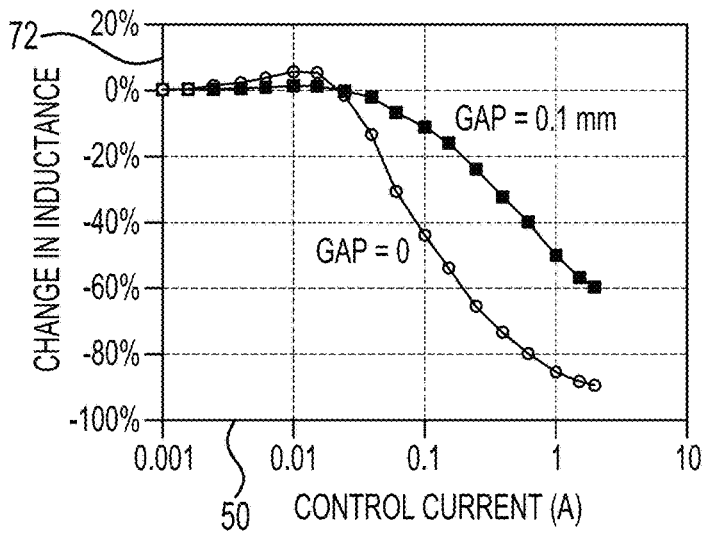
FIG. 12 is a graph showing a relationship between a change in inductance and the control current when the main magnetic core of FIG. 1 has a zero gap or a gap of 0.1 millimeters.

Referring now to FIGS. 11 and 12, an exemplary embodiment of the magnetic component 30 (as shown in FIG. 10) may include real air gaps 64, 66 between the main magnetic core 34 and the VRCE 38 that have a width of approximately 0.1 millimeters. Other widths may be suitable and selected to achieve a specific magnetic characteristic. FIG. 11 shows the relationship between inductance 70 and the control current 50 when the magnetic component 30 has the air gap of 0.1 millimeters and when the magnetic component 30 has an air gap of zero. FIG. 12 shows the change in inductance 72. As shown in FIG. 11, when the real air gaps 64, 66 are 0.1 millimeters, the inductance may vary up to 60% over a range of the control current 50 that is between approximately 0.001 and 10 amps. If the real air gap is reduced to zero, the initial inductance when the control current is zero is greater due to the lower reluctance. Accordingly, a 90% variation of the inductance is enabled if the magnetic component 30 does not include a real air gap.

As shown in FIG. 12, the initial inductance may not be the highest value as low reluctance at low values of the control current will cause the flux from the power winding 36 to slightly saturate the main magnetic core 34. Thus, as the control current increases to approximately 10 milliamps, the main magnetic core 34 will come out of saturation and the VRCE 38 will enter saturation which causes the inductance to slightly increase before decreasing.

Figure 13:
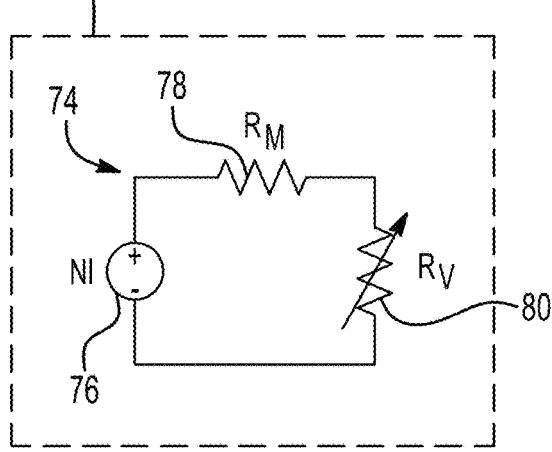
FIG. 13 shows a magnetic circuit for the magnetic component of FIG. 1.
Figure 14:
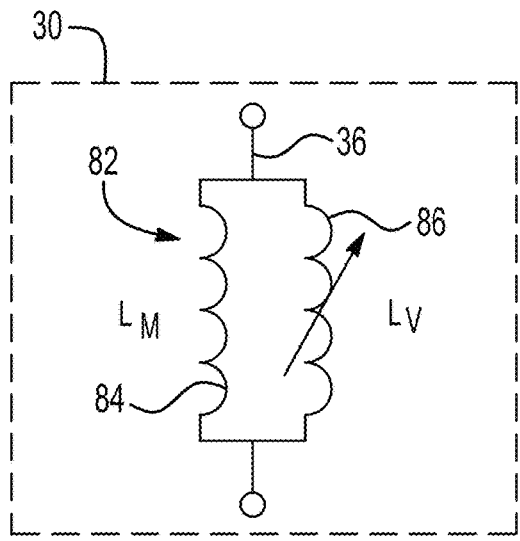
FIG. 14 shows an electric circuit for the magnetic component of FIG. 1.

Referring now to FIGS. 13 and 14, FIG. 13 is a schematic drawing of a magnetic circuit 74 for the magnetic component 30 showing the magnetomotive force NI 76, or the product of current and number of times the current is wrapped around the magnetic core, i.e. ampere-turns, the reluctance $R_M$ 78 of the main magnetic core 34 of the magnetic component 30 (as shown in FIG. 1) and the reluctance $R_V$ 80 of the VRCE 38. FIG. 14 is a schematic drawing of an electric circuit 82 for the magnetic component 30 showing the power winding 36, the inductance $L_M$ 84 of the main magnetic core 34 and the inductance $L_V$ 86 of the VRCE 38.

Figure 15:
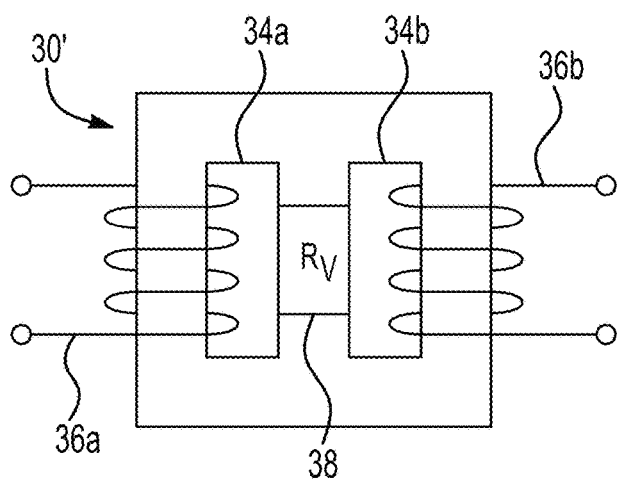
FIG. 15 shows another exemplary magnetic component having primary and secondary power windings and a single VRCE coupled between the windings.
Figure 16:
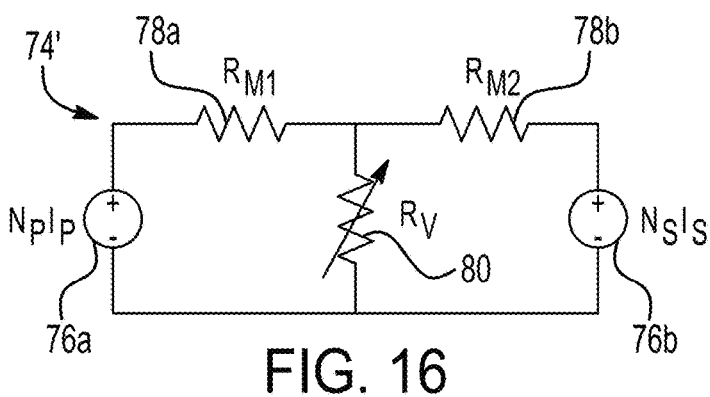
FIG. 16 shows a magnetic circuit for the magnetic component of FIG. 15.
Figure 17:
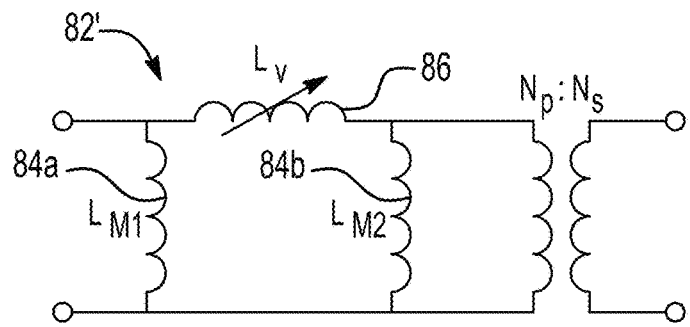
FIG. 17 shows an electric circuit for the magnetic component of FIG. 15.

FIGS. 15-17 show another embodiment of the magnetic component 30' in which the magnetic component 30' is a transformer having a primary power winding 36a and a secondary power winding 36b, as compared with the inductor shown in FIG. 1 that has a single winding. More than two power windings may be used. The power windings 36a, 36b are coupled by mutual inductance and wound around corresponding sections 34a, 34b of the main magnetic core. The location of the VRCE 38 within the magnetic component 30' is selected to control the magnetic characteristics of the transformer. The arrangement of the VRCE 38 shown in FIG. 15 is exemplary and other arrangements within the magnetic component 30' may be suitable.

FIG. 16 is a schematic drawing of a magnetic circuit 74' for the magnetic component 30' showing the magnetomotive force $N_P I_P$ 76a for the primary winding 36a, the magnetomotive force $N_S I_S$ 76b for the secondary winding 36b, the reluctance $R_{M1}$ 78a in the first section 34a of the main magnetic core corresponding to the primary winding 36a, the reluctance $R_{M2}$ 78b in the second section 34b corresponding to the secondary winding 36b, and the reluctance $R_V$ 80 of the VRCE 38. FIG. 17 is a schematic drawing of an electric circuit 82' for the magnetic component 30' showing the inductance $L_{M1}$ 84a of the first section 34a of the main magnetic core, the inductance $L_{M2}$ 84b of the second section 34b, and the inductance $L_V$ 86 of the VRCE 38. Using the VRCE 38 to control the coupling between the primary and secondary windings 36a, 36b is particularly advantageous in maintaining the leakage inductance below a predetermined threshold to prevent decoupling between the windings 36a, 36b.

Figure 18:
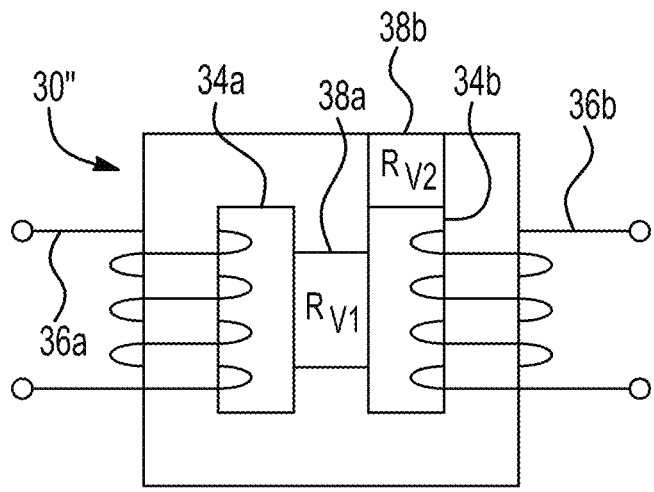
FIG. 18 shows still another exemplary magnetic component having primary and secondary power windings and two VRCEs.
Figure 19:
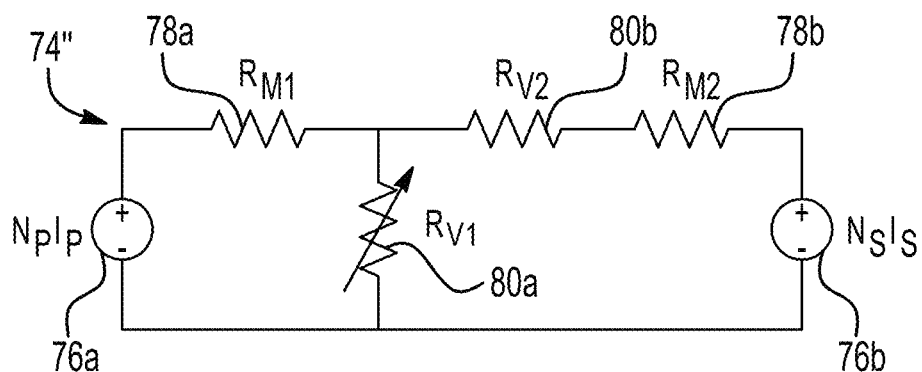
FIG. 19 shows a magnetic circuit for the magnetic component of FIG. 18.
Figure 20:
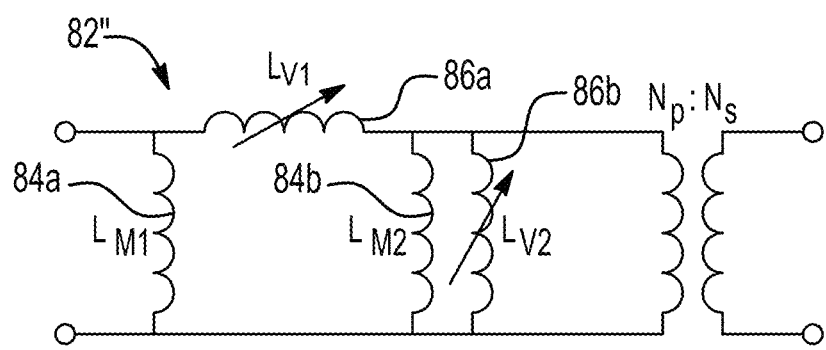
FIG. 20 shows an electric circuit for the magnetic component of FIG. 18.

FIGS. 18-20 show another embodiment of a magnetic component 30" in which the magnetic component 30" is a transformer having the primary power winding 36a and the secondary power winding 36b, and two VRCEs 38a, 38b arranged at different locations within the magnetic component 30". The first VRCE 38a is coupled between the first section 34a and the second section 34b of the main magnetic core to control leakage inductance and maintain the coupling between the primary power winding 36a and the secondary power winding 36b. The leakage inductance is maintained below a predetermined threshold at which the power windings 36a, 36b would decouple. The second VRCE 38b is only coupled to the second section 34b and may be used to control the magnetizing inductance. For example, the second VRCE 38b may be used to control how much current is being drawn in the first section 34a of the main magnetic core. The VRCEs 38a, 38b may be the same or different and are arranged to enable a low power loss. The arrangement of the VRCEs 38a, 38b shown in FIG. 18 is exemplary and other arrangements within the magnetic component 30" may be suitable. More than two VRCEs 38a, 38b may be suitable and the number of VRCEs 38a, 38b is dependent on the application.

FIG. 19 is a schematic drawing of a magnetic circuit 74" for the magnetic component 30" showing the magnetomotive force $N_P I_P$ 76a for the primary winding 36a, the magnetomotive force $N_S I_S$ 76b for the secondary winding 36b, the reluctance $R_{M1}$ 78a in the first section 34a of the main magnetic core corresponding to the primary winding 36a, and the reluctance $R_{M2}$ 78b in the second section 34b corresponding to the secondary winding 36b. FIG. 19 also shows the reluctance $R_{V1}$ 80a of the first VRCE 38a and the reluctance $R_{V2}$ 80b of the second VRCE 38b. FIG. 20 is a schematic drawing of an electric circuit 82" for the magnetic component 30" showing the inductance $L_{M1}$ 84a of the first section 34a of the main magnetic core, the inductance $L_{M2}$ 84b of the second section 34b, the inductance $L_{V1}$ 86a of the first VRCE 38a, and the inductance $L_{V2}$ 86b of the second VRCE 38b. Using more than one VRCE 38a, 38b in the transformer is particularly advantageous in controlling both leakage and magnetizing inductances.

Figure 21:
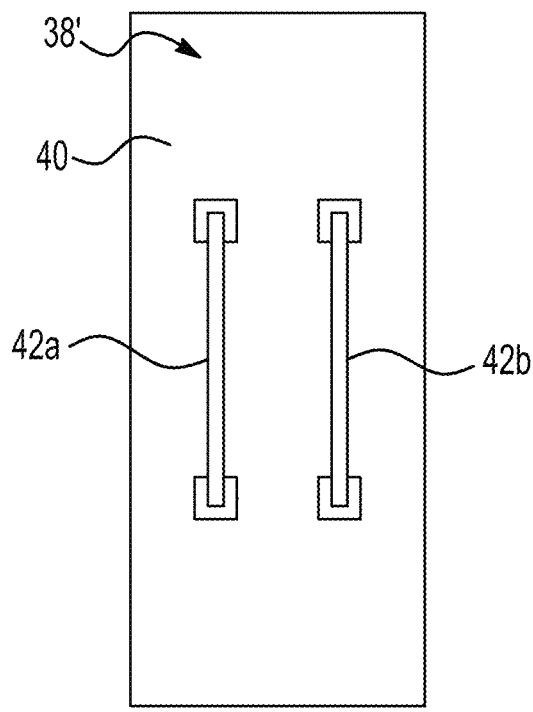
FIG. 21 shows another exemplary VRCE having two control windings.

Referring now to FIG. 21, another exemplary embodiment of the VRCE 38' is shown in which the saturable magnetic core 38 includes two control windings 42a, 42b, as compared with the previously shown VRCEs that include one control winding. The control windings 42a, 42b may have any arrangement in the saturable magnetic core 38 and more than two control windings 42a, 42b may be provided. The number of turns and shape of the turns in each control winding 42a, 42b may be the same or different and all of the control windings may be oriented to eliminate induced voltage on the control windings. A predetermined spacing may be provided between the control windings 42a, 42b to further control specific magnetic characteristics.

Figure 22:
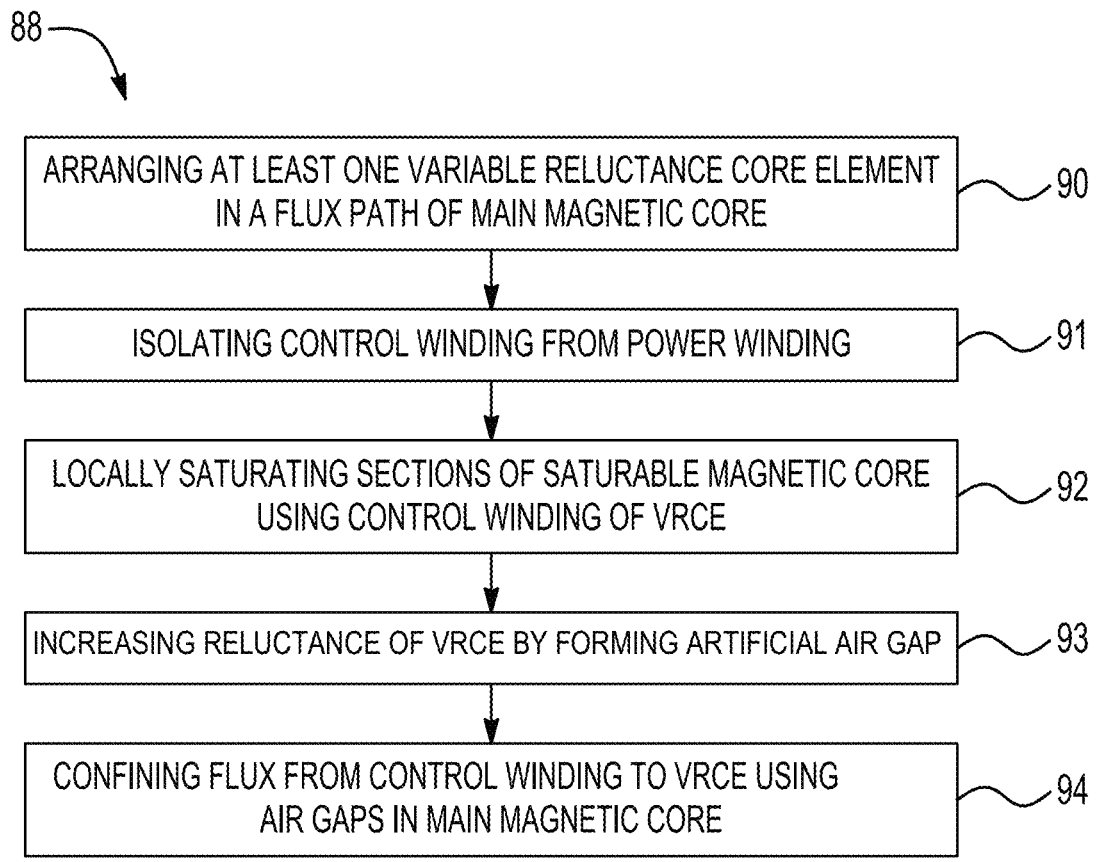
FIG. 22 shows a flowchart illustrating a method of varying magnetic characteristics of a magnetic component, such as the magnetic component shown in FIG. 1.

Referring now to FIG. 22, a method 88 of varying magnetic characteristics of a magnetic component having a main magnetic core and a power winding coupled to the main magnetic core is shown. The method 88 may include using the magnetic component 30, 30', 30" as previously described and the method 88 may be implemented in a magnetic component of a resonant power converter.

A first step 90 of the method 88 includes arranging a VRCE 38 in a flux path of the main magnetic core 34 of the magnetic component 30 (as shown in FIG. 1). Step 90 may include arranging a plurality of VRCEs in the magnetic component 30 and the location and number of VRCEs may be dependent on the application. Step 91 of the method 88 includes isolating the control winding 42 of the VRCE 38 from the power winding 36 of the magnetic component 30 to eliminate induced voltage on the control winding 42 (as shown in FIGS. 2-4). Step 91 may include orienting the control winding 42 in a particular direction to prevent the flux from the power winding 36 from passing through the control winding 42.

Step 92 of the method 88 includes locally saturating sections of the saturable magnetic core 40 using the control winding 42. Step 92 may include supplying the control current 50 to the control winding 42 (as shown in FIGS. 5-7). Step 93 includes increasing a reluctance 56 of the VRCE 38 by applying a voltage to the control winding 42 to form at least one artificial air gap 60, 62 in the VRCE 38 (as shown in FIGS. 7 and 8). Step 94 of the method 88 is optional and includes confining flux from the control winding 42 to the VRCE 38 using fixed air gaps 64, 66 that are formed in the main magnetic core 34 (as shown in FIG. 8).

Using the magnetic component having the control winding described herein is particularly advantageous in controlling a resonant power converter to achieve the highest power density, such as in an LLC resonant converter. The power converter may have a changing input voltage and an output voltage that is to remain constant. Resonant converters have a normalized frequency: $f_n = f_{sw}/f_{res}$, where $f_{sw}$ is the switching frequency and $f_{res} = (2\pi\sqrt{LC})^{-1}$ is the resonant frequency of the resonant capacitor and transformer leakage inductance. The highest power level and the highest power density is achieved when $f_n = 1$. The resonant frequency is fixed such that the switching frequency may also be fixed to obtain the highest power density.

The resonant power converter may regulate the output voltage if the power is limited to a subset of the converter's capability and the switching frequency is then adjusted to obtain the desired voltage conversion ratio. Thus, the power converter may achieve voltage regulation, but with a reduced power density. The resonant power converter may be controlled using a conventional magnetic amplifier to vary inductance and control the resonant frequency such that the normalized frequency is controlled independent of the switching frequency. Using the magnetic amplifier enables either high power density and frequency synchronization, i.e. maintaining $f_n$ at 1, or voltage regulation and frequency synchronization. Using the magnetic amplifier also disadvantageously causes high voltages to be induced on the control windings, which increases the size of the converter due to the structure required for high voltage isolation.

Using the magnetic component and method described is advantageous as compared with using the magnetic amplifier in that providing the transformer with variable leakage inductance, as shown in the configurations of FIGS. 15-20, eliminates induced high voltages on the control windings such that the size of the converter may be decreased while the power density is still increased. Additionally, by controlling both the leakage and magnetizing inductances of the transformer, as shown in the configurations of FIGS. 18-20, the voltage conversion ratio may also be adjusted independently of the normalized frequency such that any operating frequency may be selected. Thus, high power density, voltage regulation, and frequency synchronization may be achieved simultaneously.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A magnetic component comprising:
a main magnetic core;
a power winding coupled to the main magnetic core; and
a variable reluctance core element arranged in a flux path of the main magnetic core and including a saturable magnetic core and a control winding coupled to the saturable magnetic core, wherein the control winding is isolated relative to the power winding and configured to selectively saturate a section of the saturable magnetic core;
wherein the power winding includes a primary power winding coupled to a first section of the main magnetic core and a secondary power winding coupled to a second section of the main magnetic core; and
wherein the variable reluctance core element includes a first variable reluctance core coupled between the first section and the second section and a second variable reluctance core coupled to the second section.

2. The magnetic component according to claim 1, wherein the control winding includes at least one turn.

3. The magnetic component according to claim 1, wherein the variable reluctance core element has a geometry that defines an artificial air gap in regions around the control winding when current is applied to the control winding.

4. The magnetic component according to claim 1 further comprising an air gap defined between the main magnetic core and the at least one variable reluctance core element.

5. The magnetic component according to claim 1, wherein the control winding is configured to receive a DC voltage.

6. The magnetic component according to claim 1, wherein the control winding is configured to receive an AC voltage.

7. The magnetic component according to claim 1, wherein the variable reluctance core element includes more than one control winding.

8. The magnetic component according to claim 1 further comprising a plurality of variable reluctance core elements that are arranged at different locations around the main magnetic core.

9. A resonant power converter comprising:
a magnetic component having a main magnetic core and a power winding coupled to the main magnetic core; and
a variable reluctance core element arranged in a flux path of the main magnetic core and including a saturable magnetic core and a control winding coupled to the saturable magnetic core, wherein the control winding is isolated relative to the power winding and configured to selectively saturate a section of the saturable magnetic core;
wherein the power winding includes a primary power winding coupled to a first section of the main magnetic core and a secondary power winding coupled to a second section of the main magnetic core; and
wherein the variable reluctance core element includes a first variable reluctance core coupled between the first section and the second section and a second variable reluctance core coupled to the second section.

10. The resonant power converter according to claim 9, wherein the control winding includes at least one turn.

11. The resonant power converter according to claim 9, wherein the variable reluctance core element has a geometry that defines an artificial air gap in regions around the control winding when current is applied to the control winding.

12. The resonant power converter according to claim 9 further comprising an air gap defined between the main magnetic core and the at least one variable reluctance core element.

13. The resonant power converter according to claim 9, wherein the control winding is configured to receive a DC or AC voltage.

14. A method of varying magnetic characteristics of a magnetic component having a main magnetic core and a power winding coupled to the main magnetic core, the method comprising:

arranging a variable reluctance core element in a flux path of the main magnetic core;

isolating a control winding of the variable reluctance core element from the power winding;

locally saturating sections of a saturable magnetic core of the variable reluctance core element using the control winding; and increasing a reluctance of the variable reluctance core element by applying a voltage to the control winding to form at least one artificial air gap in the variable reluctance core element.

15. The method according to claim 14 further comprising confining flux from the control winding to the variable reluctance core element using air gaps in the main magnetic core.

* * * * *